United States Patent
Alam et al.

(10) Patent No.: US 10,272,785 B2
(45) Date of Patent: Apr. 30, 2019

(54) FAULT DETECTION OF A BYPASS DIODE IN A VARIABLE VOLTAGE CONVERT SYSTEM

(71) Applicant: Ford Global Technologies, LLC, Dearborn, MI (US)

(72) Inventors: Mohammed Khorshed Alam, Dearborn, MI (US); Yan Zhou, Canton, MI (US); Shuitao Yang, Dearborn Heights, MI (US); Fan Xu, Novi, MI (US); Lihua Chen, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 174 days.

(21) Appl. No.: 15/420,164

(22) Filed: Jan. 31, 2017

(65) Prior Publication Data

US 2018/0215269 A1    Aug. 2, 2018

(51) Int. Cl.

| | |
|---|---|
| *B60L 1/00* | (2006.01) |
| *B60L 3/00* | (2019.01) |
| *H02M 3/04* | (2006.01) |
| *H02M 7/44* | (2006.01) |
| *B60L 15/00* | (2006.01) |
| *B60L 15/20* | (2006.01) |
| *H02P 27/06* | (2006.01) |

(Continued)

(52) U.S. Cl.
CPC .............. *B60L 3/003* (2013.01); *B60L 1/003* (2013.01); *B60L 11/1811* (2013.01); *B60L 11/1814* (2013.01); *B60L 11/1816* (2013.01); *B60L 15/007* (2013.01); *B60L 15/20* (2013.01); *H02M 3/04* (2013.01); *H02M 7/44* (2013.01); *H02P 27/06* (2013.01); *B60L 11/02* (2013.01); *B60L 2210/10* (2013.01); *B60L 2210/30* (2013.01); *B60L 2210/40* (2013.01); *H02P 2201/09* (2013.01); *Y02T 10/644* (2013.01); *Y02T 10/7005* (2013.01); *Y02T 10/7241* (2013.01); *Y10S 903/904* (2013.01)

(58) Field of Classification Search
CPC ...... B60L 1/003; B60L 3/003; B60L 11/1811; B60L 11/1816; B60L 15/007; B60L 2210/30; B60L 2210/40; H02M 3/04; H02M 7/44; H02P 27/06; Y10S 903/904
USPC .................................................. 307/9.1, 10.1
See application file for complete search history.

(56) References Cited

U.S. PATENT DOCUMENTS

| | | | |
|---|---|---|---|
| 7,839,665 B2 * | 11/2010 | Toba ...................... | H02H 7/122 307/127 |
| 9,088,224 B2 * | 7/2015 | Chen ..................... | H02M 3/155 |

(Continued)

*Primary Examiner* — Hal Kaplan
(74) *Attorney, Agent, or Firm* — Brooks Kushman P.C.

(57) ABSTRACT

A vehicle powertrain includes a variable voltage converter, a bypass diode and a controller. The bypass diode may be coupled in parallel with the converter and configured to clamp an output of the converter to a battery voltage. The controller may be configured to, while in a boost mode and in response to a rate of change of a converter inductor current exceeding a boost threshold, open switches of the converter to divert propulsive energy through the bypass diode. The controller may also be configured to, while in buck mode and in response to a magnitude of a converter inductor current exceeding a buck threshold, open switches of the converter to divert regenerative energy through the bypass diode, while reversed biased, to the battery.

20 Claims, 8 Drawing Sheets

(51) Int. Cl.
*B60L 11/18* (2006.01)
*B60L 11/02* (2006.01)

(56) References Cited

U.S. PATENT DOCUMENTS

| | | | |
|---|---|---|---|
| 9,667,140 B2 * | 5/2017 | Sugawara | H02M 3/156 |
| 2008/0304298 A1 | 12/2008 | Toba et al. | |
| 2012/0019231 A1 | 1/2012 | Chen | |
| 2015/0137784 A1 | 5/2015 | Sugawara | |

* cited by examiner

FAULT DETECTION OF A BYPASS DIODE IN A VARIABLE VOLTAGE CONVERT SYSTEM

TECHNICAL FIELD

This application is generally related to a system configured to detect a fault in a bypass diode of a variable voltage converter for a hybrid-electric powertrain.

BACKGROUND

Electrified vehicles including hybrid-electric vehicles (HEVs) and battery electric vehicles (BEVs) rely on a traction battery to provide power to a traction motor for propulsion and a power inverter therebetween to convert direct current (DC) power to alternating current (AC) power. The typical AC traction motor is a 3-phase motor that may be powered by 3 sinusoidal signals each driven with 120 degrees phase separation. The traction battery is configured to operate in a particular voltage range. The terminal voltage of a typical traction battery is over 100 Volts DC and the traction battery is alternatively referred to as a high-voltage battery. However, improved performance of electric machines may be achieved by operating in a different voltage range, typically at higher voltages than the traction battery. Many electrified vehicles include a DC-DC converter also referred to as a variable voltage converter (VVC) to convert the voltage of the traction battery to an operational voltage level of the electric machine. The electric machine that may include a traction motor may require a high voltage and high current. Due to the voltage, current and switching requirements, an Insulated Gate Bipolar junction Transistor (IGBT) is typically used to generate the signals in the power inverter and the VVC.

SUMMARY

A vehicle powertrain includes a variable voltage converter, a bypass diode and a controller. The bypass diode may be coupled in parallel with the converter and configured to clamp an output of the converter to a battery voltage. The controller may be configured to, while in a boost mode and in response to a rate of change of a converter inductor current exceeding a boost threshold, open switches of the converter to divert propulsive energy through the bypass diode.

A powertrain includes a variable voltage converter, a bypass diode and a controller. The bypass diode maybe coupled in parallel with the converter and configured to clamp an output of the converter to a voltage of a battery. The controller may be configured to, while in buck mode and in response to a magnitude of a converter inductor current exceeding a buck threshold, open switches of the converter to divert regenerative energy through the bypass diode, while reversed biased, to the battery.

A method of operating a vehicle powertrain including a power inverter coupled with a bypass diode parallel with a variable voltage converter includes, while in a buck mode and in response to a rate of change of an inductor current exceeding a buck threshold, by a controller, opening switches of the converter to divert regenerative energy through the bypass diode, while reverse biased, to a traction battery.

DETAILED DESCRIPTION

Figure 1:
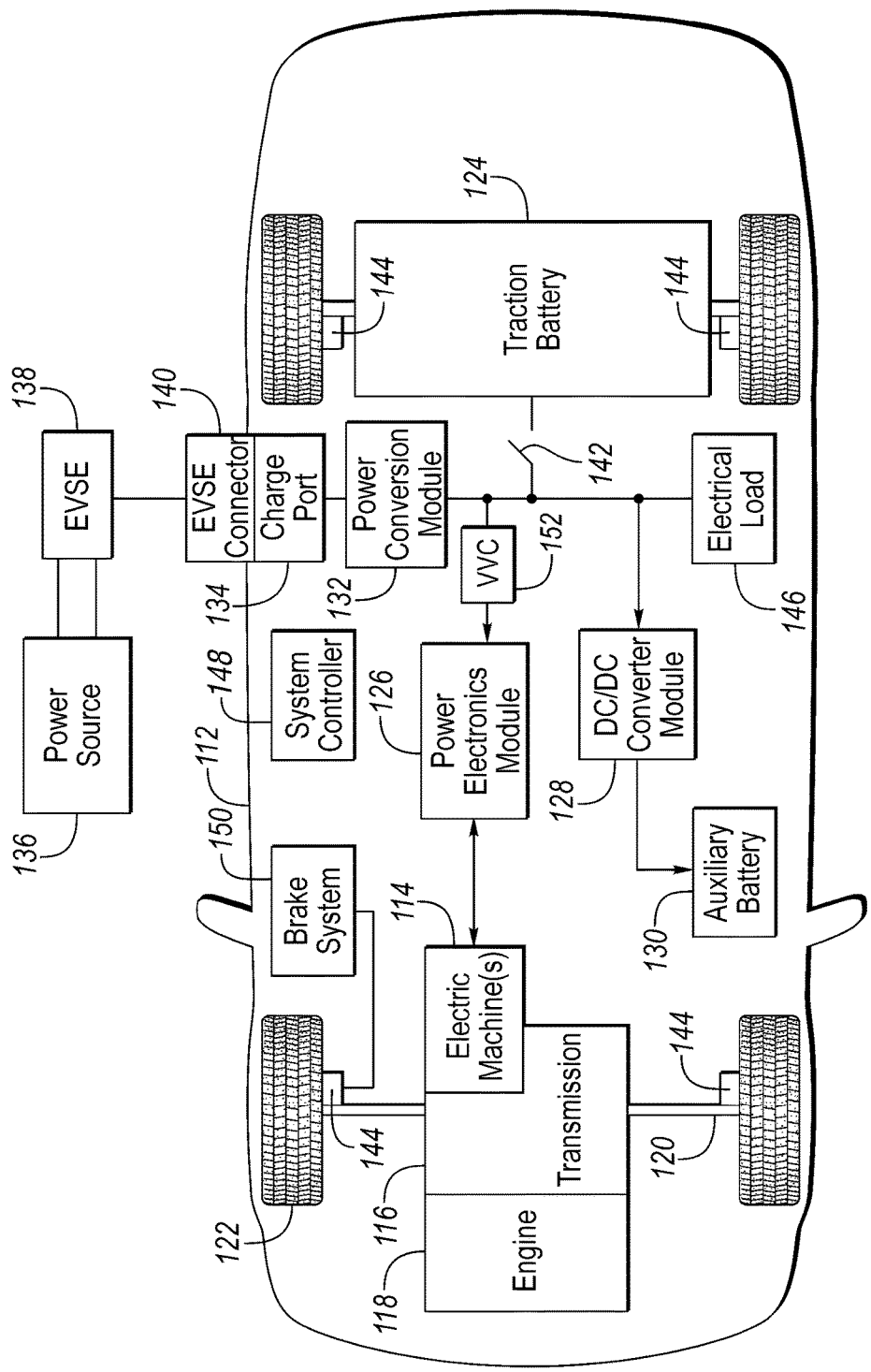
FIG. 1 is a diagram of a hybrid vehicle illustrating typical drivetrain and energy storage components with a variable voltage converter (VVC) and power inverter therebetween.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Hybrid vehicles (HEVs) such as battery electric vehicles (BEVs) and plug-in hybrid electric vehicles (PHEVs) typically are configured with at least one electric machine. When multiple electric machines are used in a powertrain of a HEV, each electric machine is typically coupled with a power inverter. When in a propulsion mode, the power inverter converts DC power from a traction battery to AC power used by the electric machine. Further, when in a regeneration mode, the power inverter converts AC power from the electric machine to DC power to be stored by the traction battery. The use of two electric machines, each coupled with a power inverter is applicable to series hybrid systems, parallel hybrid systems and series-parallel hybrid systems also referred to as power split hybrid systems. A bi-directional boost/buck DC-DC converter (e.g., variable voltage converter (VVC)) may be used for controlling the DC-link voltage to minimize the traction inverter losses. The VVC controls the supply voltage of the power inverters, also referred to as DC-link voltage or DC-bus voltage, by boosting a lower voltage (e.g., traction battery voltage) to a higher voltage (e.g., supply voltage) when in a propulsion mode. When in a regenerative mode, the VVC bucks the higher voltage (e.g., supply voltage) to a lower voltage (e.g., traction battery voltage). However, when the electric machine is operated at a voltage approximately equal to the traction battery, the VVC may operate in a bypass or pass-through mode. During the pass-through mode of the VVC, the upper IGBT is turned on and held on, at the same time as the lower IGBT is turned off and held off. To improve operation, a bypass diode may be coupled in parallel with the VVC (i.e., between the battery positive terminal and the DC-link positive terminal) to reduce the VVC losses during pass-through mode. The bypass diode can significantly reduce the VVC losses during pass-through mode when the battery discharges. The bypass diode may be a low cost diode which may not include a current sensor, a temperature sensor, or a voltage sensor.

Here, a way of operating a hybrid vehicle powertrain including a VVC and inverter during a short circuit of the bypass diode is presented. Typically different stresses on a solid state component such as a semiconductor component may result in different failure modes. For example, a diode stressed by over-heating or an over-voltage spike may result in a short circuit failure thus allowing a current to flow in either direction through the diode. While a diode that is stressed by a high current surge may result in an open circuit failure. Also, semiconductor components, such as a diode, may be constructed out of Silicon (Si), Silicon-Carbide (SiC), Germanium (Ge), gallium arsenide (GaAs), or other materials. When operating a DC-DC converter including a bypass diode in a boost mode under this proposed strategy, the controller may be configured to inhibit modulate of IGBTs of the VVC such that current flows through the short circuit of the diode thereby protecting components of the VVC while permitting the vehicle to operate in a limited capacity. In an alternative embodiment, when operating in a buck mode under this proposed strategy, the controller may be configured to inhibit modulation of the IGBTs of the VVC while the controller operates the inverter in a mode to generate a DC voltage at the battery voltage to flow a current through a shorted bypass diode to recharge the battery thereby protecting components of the VVC while permitting the vehicle to operate in a limited capacity. Here, the controller may change operation of the VVC and inverter in response to a rate of change of inductor current exceeding a threshold, or a magnitude of inductor current exceeding a threshold.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery pack 124 stores energy that can be used by the electric machines 114. The vehicle battery pack 124 may provide a high voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) 152 electrically coupled between the traction battery 124 and the power electronics module 126. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 2:
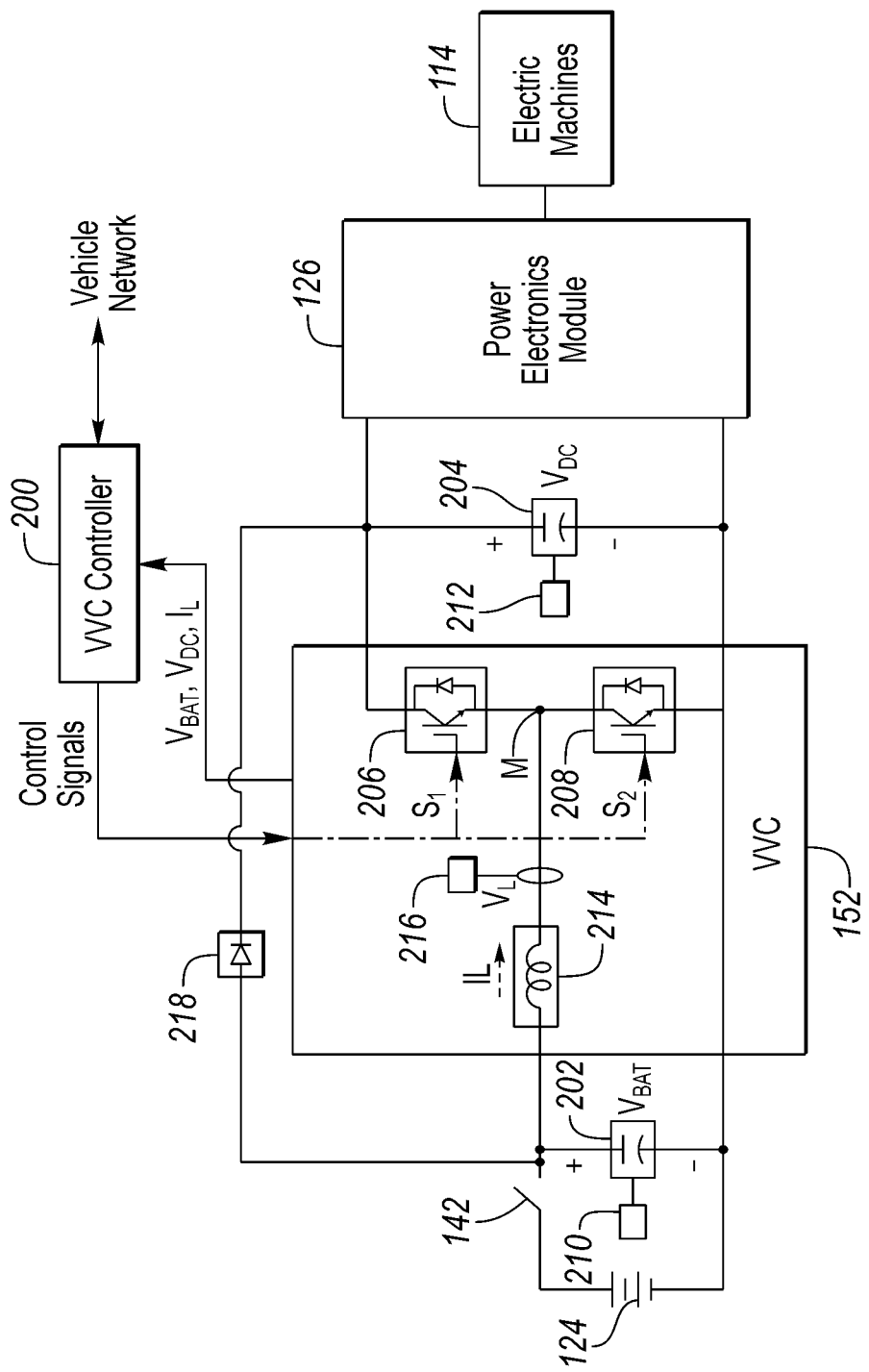
FIG. 2 is a schematic diagram of a vehicular variable voltage converter (VVC) including a bypass diode.

FIG. 2 depicts a diagram of a VVC 152 that is configured as a boost converter. The VVC 152 may include input terminals that may be coupled to terminals of the traction battery 124 through the contactors 142. The VVC 152 may include output terminals coupled to terminals of the power electronics module 126. The VVC 152 may be operated in a boost mode to cause a voltage at the output terminals to be greater than a voltage at the input terminals. The VVC 152 may be operated in a buck mode to cause a voltage at the output terminals to be less than a voltage at the input terminals. The VVC 152 may be operated in a bypass mode to cause a voltage at the output terminals to be approximately equal to a voltage at the input terminals. The vehicle 112 may include a VVC controller 200 that monitors and controls electrical parameters (e.g., voltage and current) at various locations within the VVC 152. In some configurations, the VVC controller 200 may be included as part of the VVC 152. The VVC controller 200 may determine an output voltage reference, $V^*_{dc}$. The VVC controller 200 may determine, based on the electrical parameters and the voltage reference, $V^*_{dc}$, a control signal sufficient to cause the VVC 152 to achieve the desired output voltage. In some configurations, the control signal may be implemented as a pulse-width modulated (PWM) signal in which a duty cycle of the PWM signal is varied. The control signal may be operated at a predetermined switching frequency. The VVC controller 200 may command the VVC 152 to provide the desired output voltage using the control signal. The particular control signal at which the VVC 152 is operated may be directly related to the amount of voltage boost to be provided by the VVC 152.

The output voltage of the VVC 152 may be controlled to achieve a desired reference voltage. In some configurations, the VVC 152 may be a boost converter. In a boost converter configuration in which the VVC controller 200 controls the duty cycle, the ideal relationship between the input voltage $V_{in}$ and the output voltage $V_{out}$ and the duty cycle D may be illustrated using the following equation:

$$V_{out} = \frac{V_{in}}{(1-D)} \qquad 1)$$

The desired duty cycle, D, may be determined by measuring the input voltage (e.g., traction battery voltage) and setting the output voltage to the reference voltage. The VVC 152 may be a buck converter that reduces the voltage from input to output. In a buck configuration, a different expression relating the input and output voltage to the duty cycle may be derived. In some configurations, the VVC 152 may be a buck-boost converter that may increase or decrease the input voltage. The control strategy described herein is not limited to a particular variable voltage converter topology.

With reference to FIG. 2, the VVC 152 may boost or "step up" the voltage potential of the electrical power provided by the traction battery 124. The traction battery 124 may provide high voltage (HV) DC power. High voltage is any voltage greater than 100 Volts DC or 100 Volts AC. In some configurations, the traction battery 124 may provide a voltage between 150 and 400 Volts. The contactor 142 may be electrically coupled in series between the traction battery 124 and the VVC 152. When the contactor 142 is closed, the HV DC power may be transferred from the traction battery 124 to the VVC 152. An input capacitor 202 may be electrically coupled in parallel to the traction battery 124. The input capacitor 202 may stabilize the bus voltage and reduce any voltage and current ripple. The VVC 152 may receive the HV DC power and boost or "step up" the voltage potential of the input voltage according to the duty cycle.

An output capacitor 204, $V_{DC}$, may be electrically coupled between the output terminals of the VVC 152. The output capacitor 204 may stabilize the bus voltage and reduce voltage and current ripple at the output of the VVC 152.

Further with reference to FIG. 2, the VVC 152 may include a first switching device 206 and a second switching device 208 for boosting an input voltage to provide the boosted output voltage. The first switching device 206 may also be referred to as an upper output switch, and the second switching device 208 may also be referred to as a lower output switch. The switching devices 206, 208 may be configured to selectively flow a current to an electrical load (e.g., power electronics module 126 and electric machines 114). Each switching device 206, 208 may be individually controlled by a gate drive circuit (not shown) of the VVC controller 200 and may include any type of controllable switch (e.g., an insulated gate bipolar junction transistor or insulated gate bipolar transistor (IGBT) or field-effect transistor (FET)). The gate drive circuit may provide electrical signals to each of the switching devices 206, 208 that are based on the control signal (e.g., duty cycle of PWM control signal). A diode may be coupled across each of the switching devices 206, 208. The switching devices 206, 208 may each have an associated switching loss. The switching losses are those power losses that occur during state changes of the switching device (e.g., on/off and off/on transitions). The switching losses may be quantified by the current flowing through and the voltage across the switching device 206, 208 during the transition. The switching devices may also have associated conduction losses that occur when the device is switched on.

The vehicle system may include sensors for measuring electrical parameters of the VVC 152. A first voltage sensor 210 may be configured to measure the input voltage, (e.g., voltage of the battery 124), and provide a corresponding input signal ($V_{bat}$) to the VVC controller 200. In one or more embodiments, the first voltage sensor 210 may measure the voltage across the input capacitor 202, which corresponds to the battery voltage. A second voltage sensor 212 may measure the output voltage of the VVC 152 and provide a corresponding input signal ($V_{dc}$) to the VVC controller 200. In one or more embodiments, the second voltage sensor 212 may measure the voltage across the output capacitor 204, which corresponds to the DC bus voltage. The first voltage sensor 210 and the second voltage sensor 212 may include circuitry to scale the voltages to a level appropriate for the VVC controller 200. The VVC controller 200 may include circuitry to filter and digitize the signals from the first voltage sensor 210 and the second voltage sensor 212.

An input inductor 214, $I_L$, may be electrically coupled in series between the traction battery 124 and the switching devices 206, 208. The input inductor 214 may alternate between storing and releasing energy in the VVC 152 to enable the providing of the variable voltages and currents as VVC 152 output, and the achieving of the desired voltage boost. A current sensor 216 may measure the input current through the input inductor 214 and provide a corresponding current signal (I_L) to the VVC controller 200. The input current through the input inductor 214 may be a result of the voltage difference between the input and the output voltage of the VVC 152, the conducting time of the switching devices 206, 208, and the inductance L of the input inductor 214. The VVC controller 200 may include circuitry to scale, filter, and digitize the signal from the current sensor 216. In another embodiment, a bypass diode 218 may be coupled between the input of the VVC and the output of the VVC such that the output of the VVC (e.g., inverter input voltage) is clamped to the input voltage of the VVC (e.g., the traction battery voltage).

The VVC controller 200 may be programmed to control the output voltage of the VVC 152. The VVC controller 200 may receive input from the VVC 152 and other controllers via the vehicle network, and determine the control signals. The VVC controller 200 may monitor the input signals ($V_{bat}$, $V_{dc}$, $I_L$, $V^*_{dc}$) to determine the control signals. For example, the VVC controller 200 may provide control signals to the gate drive circuit that correspond to a duty cycle command. The gate drive circuit may then control each switching device 206, 208 based on the duty cycle command.

The control signals to the VVC 152 may be configured to drive the switching devices 206, 208 at a particular switching frequency. Within each cycle of the switching frequency, the switching devices 206, 208 may be operated at the specified duty cycle. The duty cycle defines the amount of time that the switching devices 206, 208 are in an on-state and an off-state. For example, a duty cycle of 100% may operate the switching devices 206, 208 in a continuous on-state with no turn off. A duty cycle of 0% may operate the switching devices 206, 208 in a continuous off-state with no turn on. A duty cycle of 50% may operate the switching devices 206, 208 in an on-state for half of the cycle and in an off-state for half of the cycle. The control signals for the two switches 206, 208 may be complementary. That is, the control signal sent to one of the switching devices (e.g., 206) may be an inverted version of the control signal sent to the other switching device (e.g., 208).

The current that is controlled by the switching devices 206, 208 may include a ripple component that has a magnitude that varies with a magnitude of the current, and the duty cycle and switching frequency of the switching devices 206, 208. Relative to the input current, the worst case ripple current magnitude occurs during relatively high input current conditions. When the duty cycle is fixed, an increase in the inductor current causes an increase in magnitude of the ripple current. The magnitude of the ripple current is also related to the duty cycle. The highest magnitude ripple current occurs when the duty cycle equals 50%.

During relatively high current conditions, the switching devices 206, 208 may experience increased voltage stress. At a maximum operating current of the VVC 152, it may be desired to select a relatively high switching frequency that reduces the ripple component magnitude with a reasonable level of switching losses. The switching frequency may be selected based on the input current magnitude such that as the input current magnitude increases, the switching frequency increases. The switching frequency may be increased up to a predetermined maximum switching frequency. The predetermined maximum switching frequency may be a level that provides a compromise between lower ripple component magnitudes and higher switching losses. The switching frequency may be changed in discrete steps or continuously over the operating current range.

The VVC controller 200 may be programmed to reduce the switching frequency in response to the current input being less than a predetermined maximum current. The predetermined maximum current may be a maximum operating current of the VVC 152. The change in the switching frequency may be based on the magnitude of the current input to the switching devices 206, 208. When the current is greater than the predetermined maximum current, the switching frequency may be set to a predetermined maximum switching frequency. As the current decreases, the magnitude of the ripple component decreases. By operating at lower switching frequencies as the current decreases, switching losses are reduced. The switching frequency may be varied based on the power input to the switching devices. As the input power is a function of the input current and the battery voltage, the input power and input current may be used in a similar manner.

Since the ripple current is also affected by the duty cycle, the switching frequency may be varied based on the duty cycle. The duty cycle may be determined based on a ratio of the input voltage to the output voltage. As such, the switching frequency may also be varied based on the ratio between the input voltage and the output voltage. When the duty cycle is near 50%, the predicted ripple current magnitude is a maximum value and the switching frequency may be set to the predetermined maximum frequency. The predetermined maximum frequency may be a maximum switching frequency value that is selected to minimize the ripple current magnitude. The switching frequency may be changed in discrete steps or continuously over the duty cycle range.

The VVC controller 200 may be programmed to reduce the switching frequency from the predetermined maximum frequency in response to a magnitude of a difference between the duty cycle and the duty cycle value (e.g, 50%) at which the predicted ripple component magnitude is a maximum. When the magnitude of the difference is less than a threshold, the switching frequency may be set to the predetermined frequency. When the magnitude of the difference decreases, the switching frequency may be increased toward the predetermined maximum frequency to reduce the ripple component magnitude. When the magnitude of the difference is less than a threshold, the switching frequency may be set to the predetermined maximum frequency.

The switching frequency may be limited to be between the predetermined maximum frequency and a predetermined minimum frequency. The predetermined minimum frequency may be a frequency level that is greater than a predetermined switching frequency of the power electronic module 126 that is coupled to an output of the voltage converter 152.

When operating the VVC in a regenerative bypass mode to flow a current from the PEM 126 to the traction battery 124, traditionally the upper IGBT 206 is turned on allowing a conduction path from the PEM 126 to the inductor 214 while the lower IGBT 208 is turned off, disconnecting the upper IGBT 206 from the system ground. The IGBTs (206, 208) are maintained in their respective state (e.g., when upper IGBT 206 is on and lower IGBT 208 is off) while in regenerative bypass mode. While in a regenerative mode, current flows from the PEM 126 to the battery 124 when the voltage across the PEM 126 is slightly greater than or approximately equal to the voltage of the battery 124.

During regenerative bypass mode, fluctuations of the DC-link voltage may result in the voltage at the PEM 126 to drop below the voltage of the battery 124. This fluctuation may cause the bypass diode 218 to conduct and flow current. When the VVC is operating in this condition, a current loop is formed in which a current flows from the positive terminal of the battery 124 through the bypass diode 218 to the terminal of the collector of the upper IGBT 206, through the upper IGBT 206, through the inductor 214 to the positive terminal of the battery 124. This current loop is also referred to as a ripple current through the bypass diode.

There may be some undesired losses incurred in the bypass diode when turned ON due to the ripple current flowing through the bypass diode. The ripple current through the bypass diode is supplied by the input capacitor 202 and the battery 124. Therefore, additional losses are due to an ESR of the input capacitor 202 and an ESR of the battery 124. Another source of the ripple current through the bypass diode is the VVC inductor 214. When the DC-link voltage fluctuates, the inductor 214 may freewheel current through the bypass diode. The freewheeled current through the inductor 214 results in undesired current circulation through the bypass diode 218 and results in additional losses in the ESR of the inductor 214. To reduce, and in some cases eliminate, the ripple current in the bypass diode 218, the upper IGBT 206 and lower IGBT 208 may be modulated.

A vehicle powertrain may include a power inverter configuration consisting of two motor drive inverters, a variable voltage converter (VVC) and a bypass diode. The two motor drive inverters may be configured such that one inverter is coupled with a generator and the other may be coupled with an electric machine. The VVC may be bi-directional capable of being operated in a boost or buck mode. The DC-DC converter (e.g., VVC) may be used for controlling the DC link voltage to minimize the traction inverter losses. During pass-through mode of the VVC, the upper IGBT 206 is typically turned ON (closed) and the lower IGBT 208 is open. In which the bypass diode 218 may then reduce the VVC losses during pass-through mode.

The bypass diode 218 may significantly reduce the VVC losses during pass-through mode such as when the battery discharges a current to an electric machine. Generally diodes (e.g., bypass diode 218) do not include on-chip current, voltage, or temperature sensors. If a bypass diode 218 has a fault that results in an open circuit of the diode 218, the inverter 126 may still operate by modulating both the upper and lower switches (206, 208) in a standard boost/buck mode. Here, if a bypass diode 218 has a fault that results in a short circuit of the diode 218, the inverter may still be operated by latching both the upper and lower switches (206, 208) OFF and flowing a current through the short circuit. If the powertrain attempts to operate the VVC in either a buck or boost mode while the diode 218 is in a short circuit condition, internal components of the VVC may become damaged thus forcing the inverter into a shut-down mode. Here, detection of a short of the diode 218 and steps to operate the traction inverter and the vehicle will be disclosed using sensors and data coupled with a powertrain controller.

In an alternative embodiment, the DC-DC converter/VVC may include 2 additional switches to form an "H" around the inductor 214 with switches 206 and 208 between the PEM 126 and the capacitor 202 (not shown).

Figure 3:
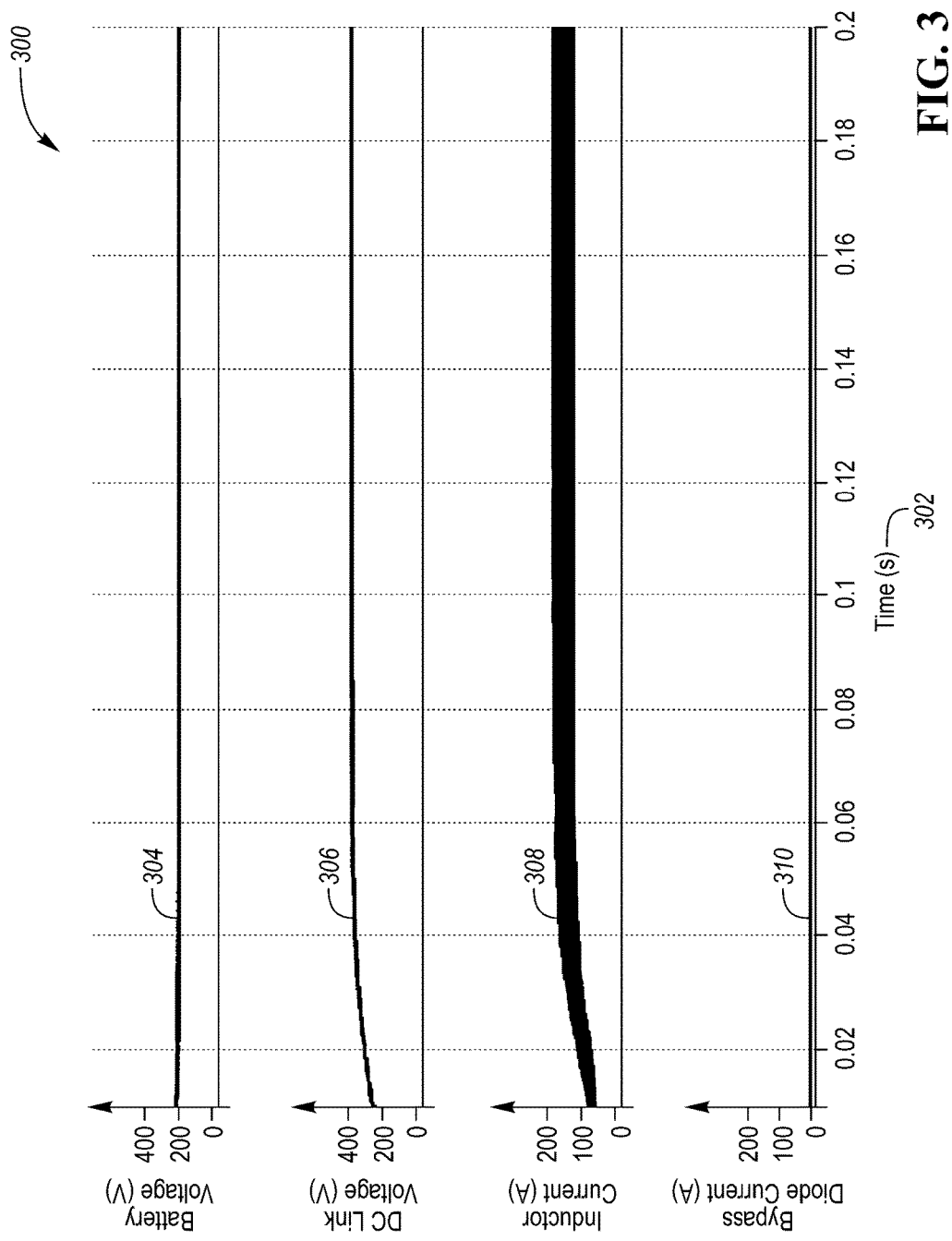
FIG. 3 is a graphical representation of operating characteristics of a VVC with a bypass diode operating in a boost mode with respect to time during normal operation.

FIG. 3 is a graphical representation 300 of operating characteristics of a VVC with a bypass diode in a boost mode with respect to time 302 during normal operation. The operating characteristics include a traction battery voltage 304, a DC-link voltage 306, a VVC inductor current 308, and a bypass diode current 310. During normal operation, when the VVC is operated in a boost mode, the DC-link voltage 306 gradually increases from about 250V to about 400V in approximately 40 mS and the VVC inductor current 308 increases from about 75 A to about 150 A in approximately 40 mS. This is a rate of change of DC link voltage 306 of approximately 4,000V/sec and a rate of change of VVC inductor current 308 of approximately 2,000 A/sec. While the current through the bypass diode is blocked due to the diode being coupled in a reverse biased orientation.

Figure 4:
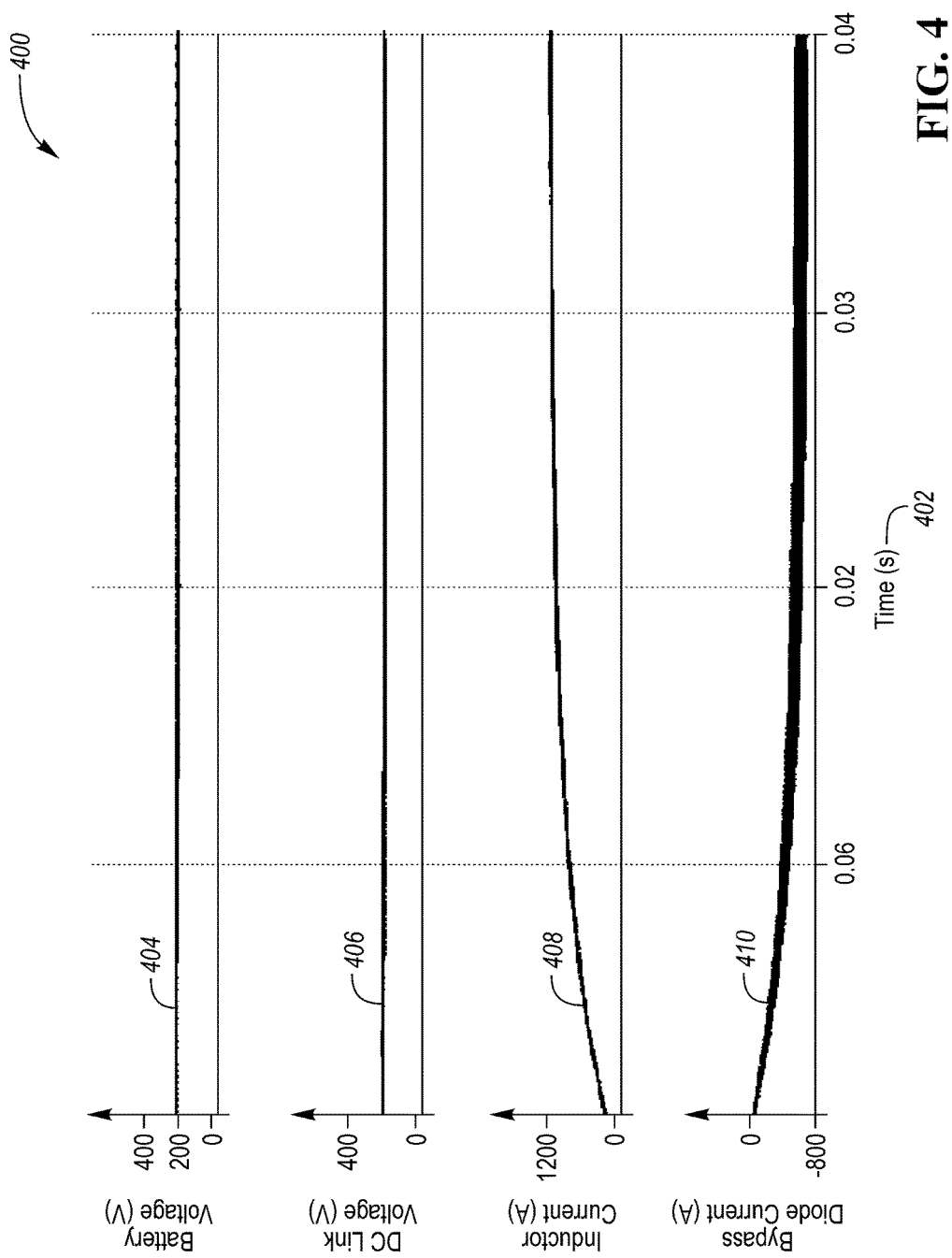
FIG. 4 is a graphical representation of operating characteristics of a VVC with a bypass diode operating in a boost mode with respect to time during bypass diode short circuit operation.

FIG. 4 is a graphical representation 400 of operating characteristics of a VVC with a bypass diode in a boost mode with respect to time 402 during bypass diode short circuit operation. The operating characteristics include a traction battery voltage 404, a DC-link voltage 406, a VVC inductor current 408, and a bypass diode current 410. During operation when the bypass diode is shorted and the VVC is operated in a boost mode, the DC-link voltage 406 is held approximately equal to the battery voltage 404 while the VVC inductor current 408 rapidly increases from about 200 A to about 1,000 A in approximately 20 mS and the bypass diode current 410 increases from about 50 A to about 800 A in approximately 20 mS. This is a rate of change of VVC inductor current 408 of approximately 40,000 A/sec which is 20 times greater than the rate of change of VVC inductor current during normal operation that is approximately 2,000 A/sec. As the bypass diode is shorted, the fact that its orientation is reverse biased is not impacted by traditional blocking of conduction while reverse biasing.

Figure 5:
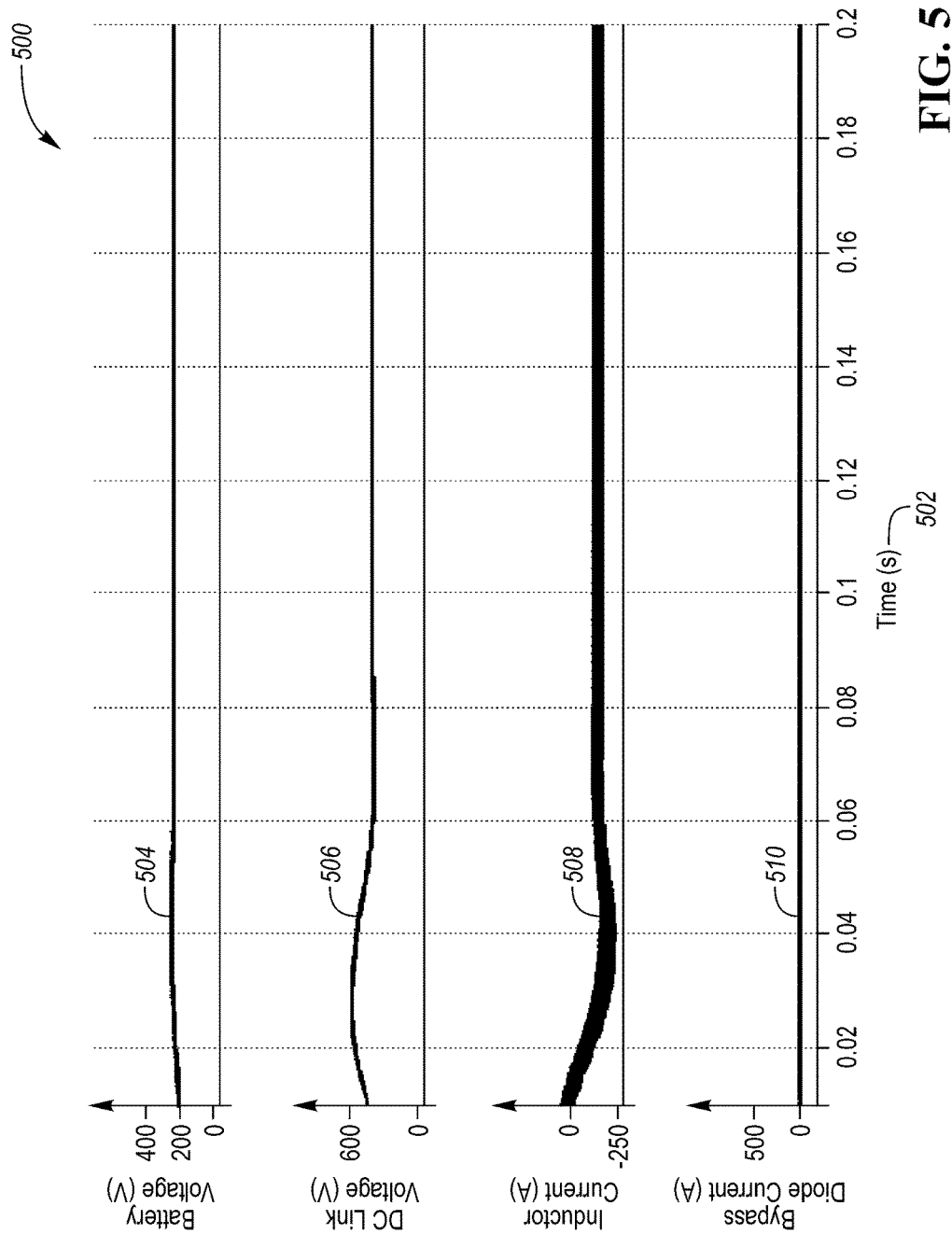
FIG. 5 is a graphical representation of operating characteristics of a VVC with a bypass diode operating in a buck mode with respect to time during normal operation.

FIG. 5 is a graphical representation 500 of operating characteristics of a VVC with a bypass diode in a buck mode with respect to time 502 during normal operation. The operating characteristics include a traction battery voltage 504, a DC-link voltage 506, a VVC inductor current 508, and a bypass diode current 510. During normal operation, when the VVC is operated in a buck mode, the DC-link voltage 306 gradually increases from about 400V to about 600V in approximately 30 mS and then settles back to 400V while the VVC inductor current 308 increases from about 0A to about 250 A in approximately 40 mS. This is a rate of change of DC link voltage 306 of approximately 7,000V/sec and a rate of change of VVC inductor current 308 of approximately 6,000 A/sec. While the current through the bypass diode is blocked due to the diode being reverse biased.

Figure 6:
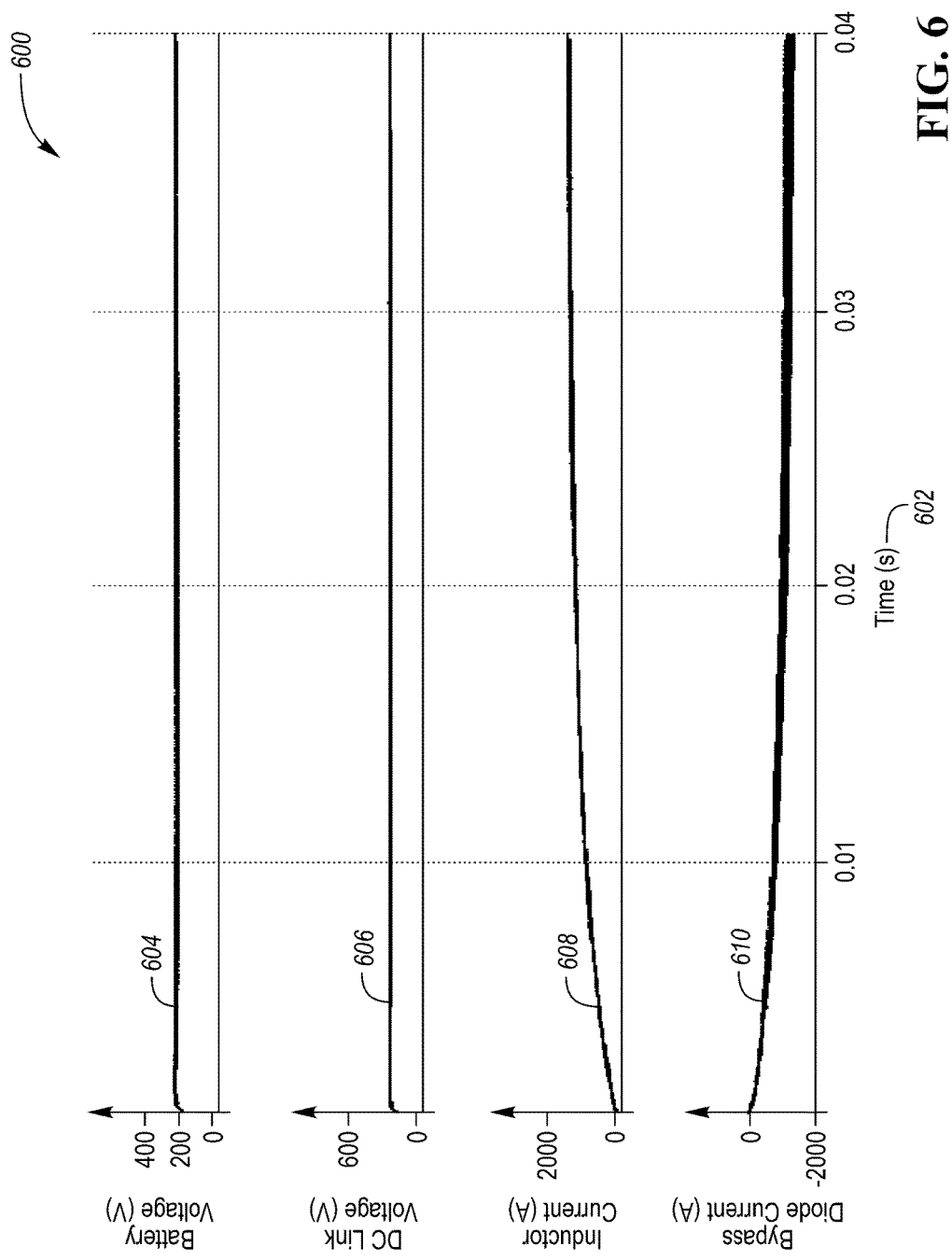
FIG. 6 is a graphical representation of operating characteristics of a VVC with a bypass diode operating in a buck mode with respect to time during bypass diode short circuit operation.

FIG. 6 is a graphical representation 600 of operating characteristics of a VVC with a bypass diode in a buck mode with respect to time during bypass diode short circuit operation. The operating characteristics include a traction battery voltage 604, a DC-link voltage 606, a VVC inductor current 608, and a bypass diode current 610. During operation when the bypass diode is shorted and the VVC is operated in a boost mode, the DC-link voltage 606 is held approximately equal to the battery voltage 604 while the VVC inductor current 608 rapidly increases from about 0A to about 1,000 A in approximately 20 mS and the bypass diode current 610 increases from about 0A to about −1,000 A in approximately 20 mS. This is a rate of change of VVC inductor current 608 of approximately 50,000 A/sec which is approximately 8 times greater than the rate of change of VVC inductor current during normal operation that is approximately 6,000 A/sec.

Based on a large difference in rates of change during operation and/or magnitude of a VVC inductor current, a short circuit condition of the bypass diode may be determined by comparing the rate of change of the VVC inductor current with a predetermined rate of change threshold or by comparing a magnitude of the VVC inductor current with a predetermined maximum inductor current. The predetermined rate of change threshold and the predetermined maximum inductor current are determined for nominal operation under a variety of conditions.

The bypass diode is configured to provide current assistance for the VVC during pass-through mode of operation to discharge the battery with improved fuel economy. However, during other operating conditions (e.g., boost/buck operation or pass-through battery charging), the bypass diode is reverse biased and does not allow current flow through the diode.

Figure 7A:
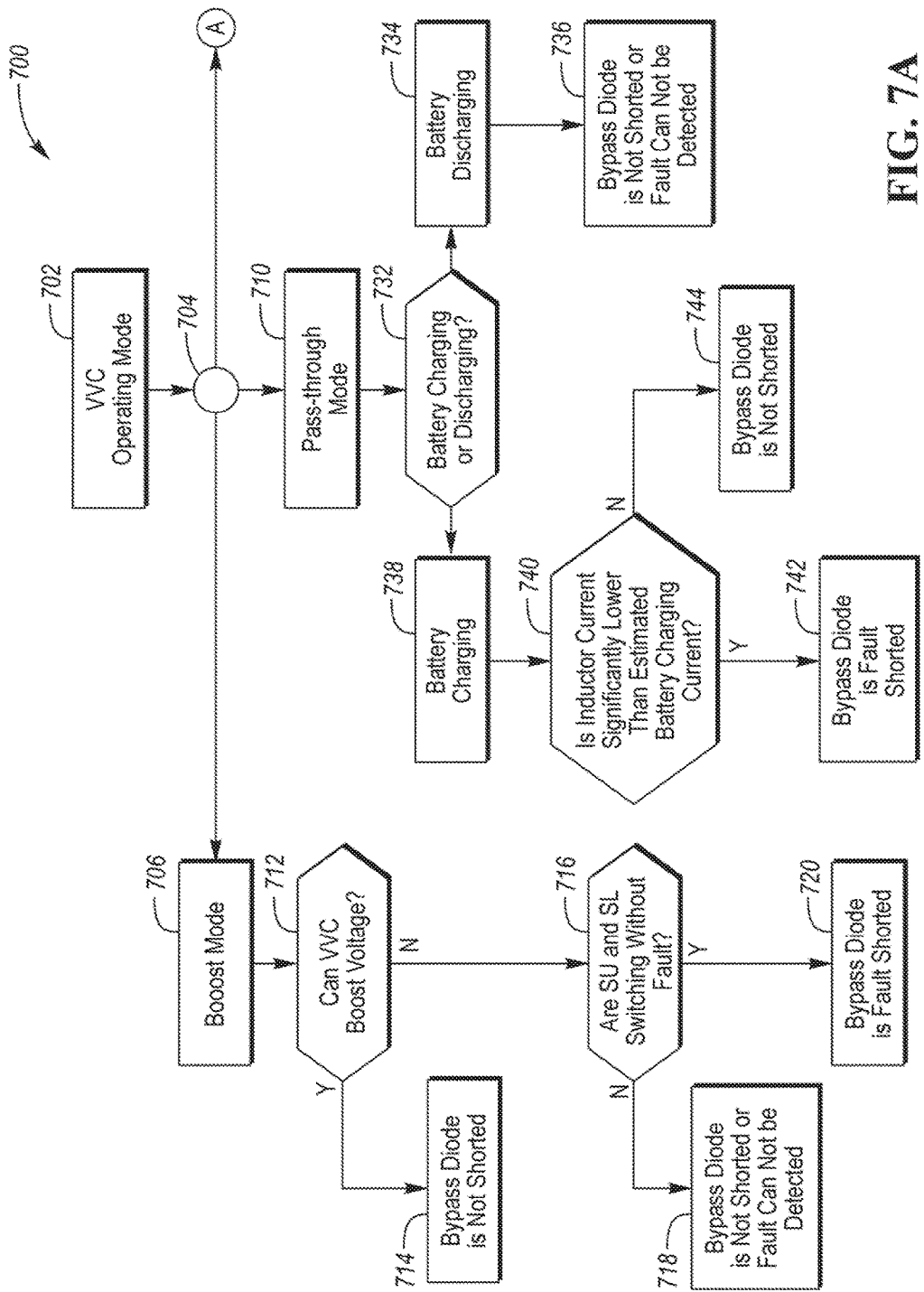
FIGS. 7A and 7B are a flow diagram of a DC-DC converter control system having a bypass diode.
Figure 7B:
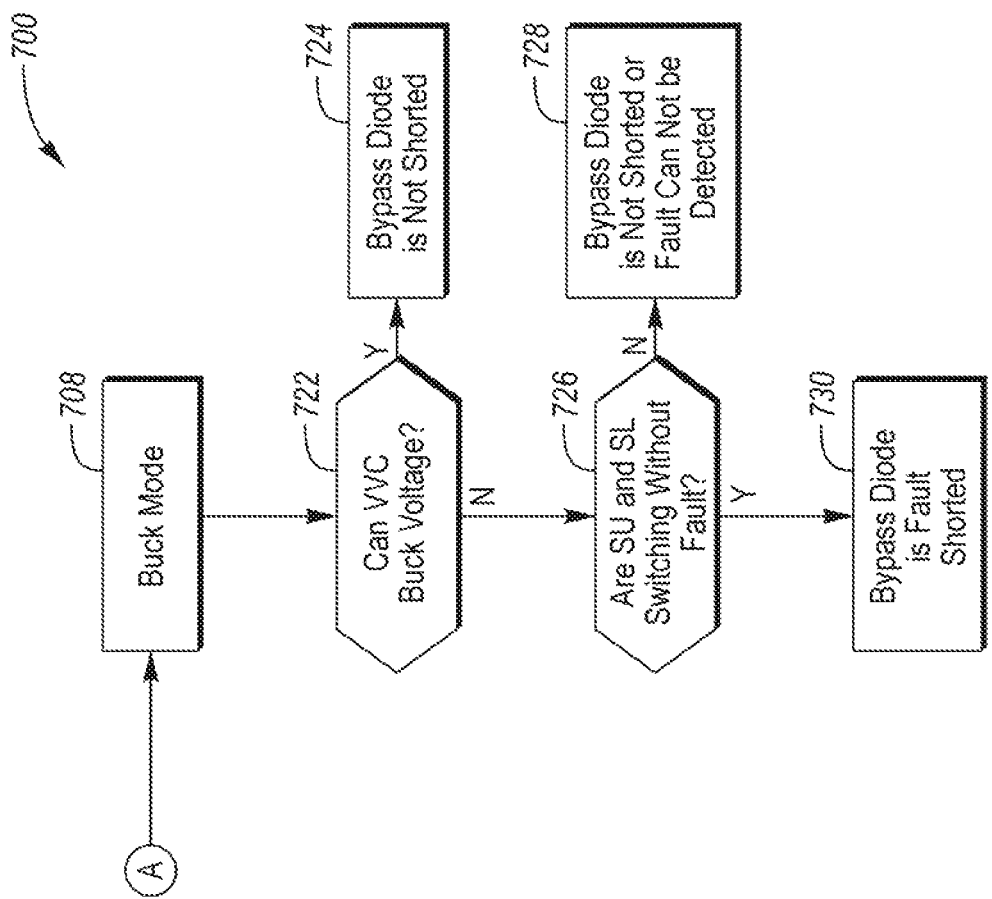

FIGS. 7A and 7B are a flow diagram 700 of a DC-DC converter control system having a bypass diode. In step 702, a controller is configured to operate a VVC in an operating mode and proceeds to step 704. In step 704, the controller branches based on the operating mode. The controller branches to step 706 if it is in a boost mode, the controller branches to step 708 if in a buck mode, and the controller branches to step 710 if in a pass through mode.

In step 706, a bypass diode is generally reverse biased as the voltage at the cathode terminal is higher than the anode terminal thus allowing the output voltage to exceed the input voltage of the VVC. However, if the diode has a short circuit fault, the VVC will not be able to boost the input voltage as illustrated in FIG. 4. Aspects of a controller may use to detect a bypass diode short circuit fault include: First, a failure to boost such that a difference between the VVC input and output terminals will be only few volts. Second, the inductor current will increase with a high rate of change and/or will exceed a maximum current value established under normal operation. Third, a duty cycle command will exceed a normal operational limit. Often these conditions may be determined using voltage sensor data at the input and output of the VVC, inductor current data by an inductor current sensor and duty cycle command data that is commanded by the controller and control circuit.

Here in step 706, the controller gathers data from VVC and vehicle sensors to assess VVC operation and proceeds to step 712. In step 712 the controller compares an input voltage of the VVC with the output voltage of the VVC, if the output voltage is greater than the input voltage while in the boost mode, the controller branches to operation 714 and exits. If the output voltage is approximately equal to the input voltage while in the boost mode, the controller branches to operation 716.

In another embodiment, in step 712 the controller compares a rate of change of current of the inductor of the VVC with a predetermined value, if the rate of change of current is less than the predetermined value while in the boost mode, the controller branches to operation 714 and exits. If the rate of change of current is greater than or equal to the predetermined value while in the boost mode, the controller branches to operation 716.

In yet another embodiment, in step 712 the controller compares a magnitude of a current of the inductor of the VVC with a predetermined value, if the magnitude of current is less than the predetermined value while in the boost mode, the controller branches to operation 714 and exits. If the magnitude of current is greater than or equal to the predetermined value while in the boost mode, the controller branches to operation 716.

In operation 716, the controller assesses the operation of switches of the VVC, if a fault with a switch of the VVC is detected, the controller branches to operation 720. In operation 720, the controller may set a bit, flag, or variable indicating a VVC switch fault and exits. If a fault with a switch of the VVC is not detected, the controller branches to operation 718.

In operation 720, the controller opens the switches of the VVC and operates the powertrain at substantially the battery voltage by flowing current through the shorted bypass diode.

Here in step 708, the controller gather data from VVC and vehicle sensors to assess VVC operation and proceeds to step 722. In step 722 the controller compares an input voltage of the VVC with the output voltage of the VVC, if the output voltage is greater than the input voltage while in the buck mode, the controller branches to operation 724 and exits. If the output voltage is approximately equal to the input voltage while in the buck mode, the controller branches to operation 726.

In another embodiment, in step 722 the controller compares a rate of change of current of the inductor of the VVC with a predetermined value, if the rate of change of current is less than the predetermined value while in the buck mode, the controller branches to operation 724 and exits. If the rate of change of current is greater than or equal to the predetermined value while in the buck mode, the controller branches to operation 726.

In yet another embodiment, in step 722 the controller compares a magnitude of a current of the inductor of the VVC with a predetermined value, if the magnitude of current is less than the predetermined value while in the buck mode, the controller branches to operation 724 and exits. If the magnitude of current is greater than or equal to the predetermined value while in the buck mode, the controller branches to operation 726.

In operation 726, the controller assesses the operation of switches of the VVC, if a fault with a switch of the VVC is detected, the controller branches to operation 730. In operation 730, the controller may set a bit, flag, or variable indicating a VVC switch fault and exits. If a fault with a switch of the VVC is not detected, the controller branches to operation 728.

In operation 730, the controller opens the switches of the VVC and operates the powertrain at substantially the battery voltage by flowing current through the shorted bypass diode.

Here in step 710, the controller gathers data from VVC and vehicle sensors to assess VVC operation and proceeds to step 732. In step 732 the controller branches to step 734 if the battery is discharging as the bypass diode may be conducting in a forward bias and proceeds to step 736 to exit. However, in step 732 the controller branches to step 738 if the battery is charging as the bypass diode may be reverse biased and proceeds to step 740. In step 740, the controller compares an inductor current with a battery current such that if the inductor current is less than the battery current by a predetermined amount, the controller will branch to 742. In operation 742, the controller opens the switches of the VVC and operates the powertrain at substantially the battery voltage by flowing current through the shorted bypass diode. In step 740, the controller compares an inductor current with a battery current such that if the inductor current is substantially equal to the battery current, the controller will branch to 744 and exit.

Basically, during pass-through mode, the bypass diode will carry current when the battery is discharging through the VVC. However, if the diode is shorted, the battery can charge or discharge through the short circuit of the bypass diode allowing the VVC to operate.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle powertrain comprising:
   a variable voltage converter;
   a bypass diode coupled in parallel with the converter and configured to clamp an output of the converter to a battery voltage; and
   a controller configured to, while in a boost mode and in response to a rate of change of a converter inductor current exceeding a boost threshold, open switches of the converter to divert propulsive energy through the bypass diode.

2. The vehicle powertrain of claim 1, wherein the controller is further configured to operate an inverter to convert a direct current (DC) current at the battery voltage to an alternating current (AC) current to drive an electric machine.

3. The vehicle powertrain of claim 1, wherein the controller is further configured to, while in a buck mode and in response to a rate of change of a converter inductor current exceeding a buck threshold, open switches of the converter to divert regenerative energy through the bypass diode while reverse biased.

4. The vehicle powertrain of claim 3, wherein the boost threshold is greater than the buck threshold.

5. The vehicle powertrain of claim 3, wherein the controller is further configured to operate an inverter to convert an alternating current (AC) current from an electric machine to a direct current (DC) current substantially at the battery voltage.

6. The vehicle powertrain of claim 1, wherein switches of the converter include an upper output switch and a lower output switch.

7. The vehicle powertrain of claim 6, wherein the switches of the converter are Insulated Gate Bipolar Junction Transistors (IGBTs).

8. The vehicle powertrain of claim 1, wherein the bypass diode is a Silicon (Si) diode or a Silicon-Carbide (SiC) diode.

9. A powertrain comprising:
   a variable voltage converter;
   a bypass diode coupled in parallel with the converter and configured to clamp an output of the converter to a voltage of a battery; and
   a controller configured to, while in buck mode and in response to a magnitude of a converter inductor current exceeding a buck threshold, open switches of the converter to divert regenerative energy through the bypass diode, while reverse biased, to the battery.

10. The powertrain of claim 9, wherein the controller is further configured to operate an inverter to convert a regenerative alternating current (AC) current from an electric machine to a direct current (DC) current substantially at the voltage of the battery.

11. The powertrain of claim 9, wherein the controller is further configured to, while the converter is in a boost mode and in response to a magnitude of a converter inductor current exceeding a boost threshold, open switches of the converter to divert propulsive energy through the bypass diode to an electric machine.

12. The powertrain of claim 11, wherein the boost threshold is greater than the buck threshold.

13. The powertrain of claim 11, wherein switches of the converter include an upper output switch and a lower output switch.

14. The powertrain of claim 13, wherein the switches of the converter are Insulated Gate Bipolar Junction Transistors (IGBTs).

15. The powertrain of claim 9, wherein the bypass diode is a Silicon (Si) diode or a Silicon-Carbide (SiC) diode.

16. A method of operating a vehicle powertrain including a power inverter coupled with a bypass diode parallel with a variable voltage converter comprising:
while in a buck mode and in response to a rate of change of an inductor current exceeding a buck threshold, by a controller, opening switches of the converter to divert regenerative energy through the bypass diode, while reverse biased, to a traction battery.

17. The method of claim 16 further comprising converting, by the power inverter, a regenerative alternating current (AC) current from an electric machine to a direct current (DC) current substantially at the voltage of the traction battery.

18. The method of claim 16 further comprising, while the converter is in a boost mode and in response to a magnitude of a converter inductor current exceeding a boost threshold, opening switches of the converter to divert propulsive energy through the bypass diode to an electric machine.

19. The method of claim 18, wherein the boost threshold is greater than the buck threshold.

20. The method of claim 16, wherein the switches are insulated gate bipolar junction transistors (IGBTs).

* * * * *